Oct. 22, 1940. J. KOLBE Re. 21,605

BODY SUSPENSION FOR VEHICLES OF ALL KINDS

Original Filed April 7, 1933 2 Sheets-Sheet 1

INVENTOR
BY Joachim Kolbe.
Dike, Calver & Gray
ATTORNEYS.

Oct. 22, 1940. J. KOLBE Re. 21,605

BODY SUSPENSION FOR VEHICLES OF ALL KINDS

Original Filed April 7, 1933 2 Sheets-Sheet 2

INVENTOR

BY Joachim Kolbe.

Dike, Calver & Gray

ATTORNEYS.

Reissued Oct. 22, 1940 Re. 21,605

UNITED STATES PATENT OFFICE 21,605

BODY SUSPENSION FOR VEHICLES OF ALL KINDS

Joachim Kolbe, Detroit, Mich.

Original No. 2,076,786, dated April 13, 1937, Serial No. 664,909, April 7, 1933. Application for reissue February 21, 1939, Serial No. 257,702. In Germany April 7, 1932

22 Claims. (Cl. 280—112)

This invention relates to a device for tilting the body of vehicles of all kinds, especially of motor vehicles going around curves. In modern vehicles, wherein there is provided a more or less rigid connection between the body and the wheel supporting means, the occupants of the vehicle are forced towards one side of the vehicle because of the centrifugal force developed as the vehicle rounds the curve.

The spring arrangements used on modern vehicles operate in such a manner that the body is pressed relative to the wheel supporting means by centrifugal force towards the outside of the curve, whereas to secure maximum comfort for the passengers of the vehicle, the opposite should actually be the case.

According to my invention and to overcome this disadvantage, links are provided as a connection between the body and the wheel supporting means. These links are movable transversely to the direction of travel of the vehicle, and are hingedly connected directly or indirectly with the body at one end, and with the wheel supporting means, which may take the form of an underframe or merely to the axle assembly, at the other end. The links are arranged in such a manner that the distance between the joints which connect them with the body is shorter than the distance between the joints which connect them with the wheel supporting means.

When a vehicle equipped with links of this type goes around a curve, the centrifugal force acting on the vehicle urges the vehicle toward the outside of the curve, and the link arrangement automatically inclines the body relative to the supporting means, the links on the inside of the curve swinging downward to lower the body on that side, and the links on the outside of the curve swinging upward to elevate the body on that side.

An embodiment of the invention is illustrated by way of example in the accompanying drawings in which.

Figure 1:
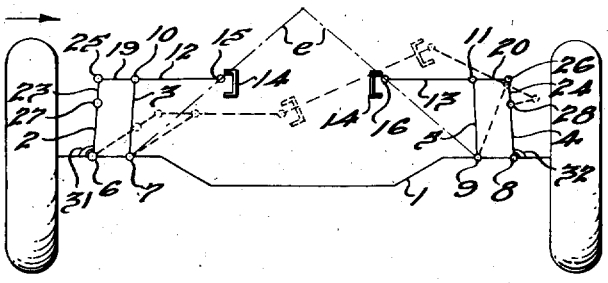
Fig. 1 is a line diagram illustrating one desirable arrangement.

In the example illustrated, the links are articulated or pivoted on each side of the front and rear wheel supporting means or axles 1. The links, in the example illustrated, are subdivided into two sections 3, 12 and 5, 13, respectively, the ends of the sections 12 and 13 being hingedly connected at 15 and 16 to the body of the vehicle indicated at 14. The sections 3 and 5 of the links are hingedly connected at one end at 7 and 9, respectively, to the wheel supporting means or axle assemblies 1 and may be hingedly connected at 10 and 11 to the sections 12 and 13, respectively, which, as pointed out above, are hingedly connected to the body 14 of the vehicle.

The links interconnecting the body and the wheel supporting means or axles are, as illustrated, hingedly connected in such a manner that the axis of the pivotal connection lies in the longitudinal direction of the vehicle. If the vehicle is subjected to a centrifugal force in the direction indicated by the arrow on Fig. 1 as when the vehicle goes around a curve, the links 3, 5, 12 and 13 of both the front and rear wheel supporting means will be moved toward the dotted line position, the links 3 and 12 on the inside of the curve swinging downwardly to lower the body 14 on that side, and the links 5 and 13 on the outside of the curve swinging upwardly to elevate the body 14 on that side.

The distances between the points of connection (15—16) of the sections 12 and 13 of the links with the body 14, and the distance between the base (7—9) of the sections 3 and 5 of the levers remains constant regardless of whether the body is in the normal or upright position or is moved to an inclined or banked position.

Guide rods which may be constructed in various manners may be provided to ensure the mutual dependency of movement of the two sections of the levers 3 and 12, and 5 and 13, respectively. These guide rods may take the form of links 2 and 4 pivotally mounted to the wheel supporting means at 6 and 8, respectively, and being prevented from moving outwardly beyond a predetermined point by stops 31 and 32, respectively. These links 2 and 4 have pivotally mounted thereto at 27 and 28, rocker levers 23 and 24, respectively. The free ends of the rocker levers are resiliently connected to the wheel supporting means 1 by the tension springs 29 and 30, respectively. The upper ends of the rocker levers 23 and 24 are hingedly connected at 25 and 26 to elbow levers 19 and 20, respectively. The other end of the elbow levers 19 and 20 are hingedly connected at the intersection of the sections 3 and 12, and 5 and 13 of the levers referred to above which interconnect the body and the wheel supporting means.

The mutual length proportions of the sections 3, 12 and 5, 13 of the linkage determines the displacement of the center of gravity of the body when assuming an inclined position when subjected to centrifugal or other forces which cause the body to incline or bank. If the sections 12 and 13 of the links are long relative to the sections 3 and 5, the center of gravity of the body will be lifted during the banking or inclining action, and the body will be returned to the normal or upright position by the force of gravity when the force inducing the inclined position ceases.

If the sections 12 and 13 of the links are short relative to the sections 3 and 5, the center of gravity of the body will descend or drop during the banking or inclining action, and the body will be returned to the normal or upright position by resilient means such, for example, as the springs 29 and 30. If the sections 12 and 13 of the links are reduced to zero, or eliminated, and the links 3 and 5 are connected to the body, the guide rods 2, 4, rocker levers 23 and 24, elbow levers 19 and 20, and the stops 31 and 32 would be superfluous and could be eliminated, however a rigid connection between the front and rear wheel supporting means or axle assemblies would be necessary in lieu thereof.

The fundamental idea of the invention is that the construction may be kept low because the center of gravity of the body may be situated above the points of suspension 15—16 on Fig. 1. The desired inclining or banking of the body under the action of lateral forces developed as when the vehicle rounds a curve or otherwise, is ensured provided the center of gravity of the body lies approximately within the triangular area *e* (Fig. 1) formed by the extension from front to rear of the imaginary lines or planes through the points 7—15 and 9—16, at the front and rear of the vehicle, defining the points of connection of the link means to the wheel supporting means or axle assembly and to the body, the base of the triangle being formed by an imaginary line interconnecting the points 7 and 9 of the axle assembly. This is an important factor in connection with motor vehicles.

Suitable spring means may be interposed between the body and the wheels to absorb vertical impulses transmitted to the wheels. A form of spring arrangement is illustrated by way of example in Figs. 2 and 3 wherein parts similar to those illustrated on Fig. 1 have been designated by similar reference characters. In the form illustrated, springs 12*a* and 13*a* may be interposed between the wheel supporting means 1 and the body 14. To prevent the springs from twisting or binding as when the vehicle is accelerated or stopped by application of the brakes or otherwise, toggle or guiding elements may be employed. The guiding elements may take the form of elements 21 and 22 pivotally connected at one end to the body 14 through the members 17 and 18, respectively, at 15 and 16, and connected at the other end to the elbow levers 19 and 20. The free ends of the elbow levers 19 and 20 may be pivotally connected to one end of the double armed rocker levers 23 and 24, pivotally mounted on the guide links 2 and 4, respectively. Tension springs 29 and 30 interconnect one end of the rocker levers 23 and 24, respectively, with the wheel supporting means 1, and resiliently urges the body to return to the normal position thereby lifting the center of gravity as the force of the springs overcomes the force inducing the body to move to an inclined or banked position.

The device operates in the following manner. The body 1 is at all times resiliently supported by the springs 12*a* and 13*a* interposed between the body and the wheel supporting means. When the vehicle negotiates a curve the body swings outwardly away from the center of the curve about the pivoted or hinge connections positioned between the body and the wheel supporting means under the influence of centrifugal force, for example, in the direction indicated by the arrow on Fig. 1. The links guide the outward movement of the body and quite naturally guide the body into an inclined or banked position. In the embodiment illustrated on Fig. 2, the stop member 32 prevents the link 4 from swinging outwardly about the point 8. The rocker levers 24 pivot about the points 28, thereby tensioning the springs 30. The links 5 can, however, swing outwardly carrying with them the elbow levers 20 which are hingedly connected to the rocker levers 24 by the pivot pins 26. The outward movement of the rocker levers 24 is limited by the radius of the arc described by the pivot pins 26 about the pivot pins 28. The inner ends of the levers 22 will, therefore, be forced to ascend and through the members 18 will lift the side of the body to which they are connected. The links 3 connected to the other side of the body, in this instance, the side of the body on the inner side of the curve, swing inward and carry with them the elbow levers 19 and the levers 21 pivoting through their connections with the members 17 about their points of connection with the body. The inner side of the body, therefore, swings downwardly, and the body is inclined toward the inner side of the curve. Since the links 2 carry the rocker levers 23 connected to the elbow levers 19 by the pivot pins 25, the rocker levers 23 and the links 2 also swing inwardly, the levers 23 pivoting about the pins 25 but remaining in alignment with the links 2 as their pivot pins 27 swing inwardly. As a result of this motion the springs 12*a* and 13*a* interposed between the body and the wheel supporting means are not materially tensioned as a result of the movement of the body to the inclined or banked position, and are free to absorb vertical impulses or shock to which the wheels are subjected.

When the curve has been negotiated, and the centrifugal force is removed, the body 14 will swing back into the generally horizontal or normal position under the influence of the force of gravity in the embodiment of the invention wherein the movement of the body to an inclined or banked position is accompanied by a raising of the center of gravity. This return movement to the normal position is assisted by the tensioned springs 30 which yieldingly urge the rocker levers 24 back into alignment with the links 5, thereby exerting a force on the outer ends of the levers 22 through the elbow levers 20. In the embodiment of the invention wherein the movement of the body to an inclined or banked position is accompanied by a lowering of the center of gravity of the body, the body will be returned to the generally horizontal or normal position by the resilient means associated with the links.

Figure 2:
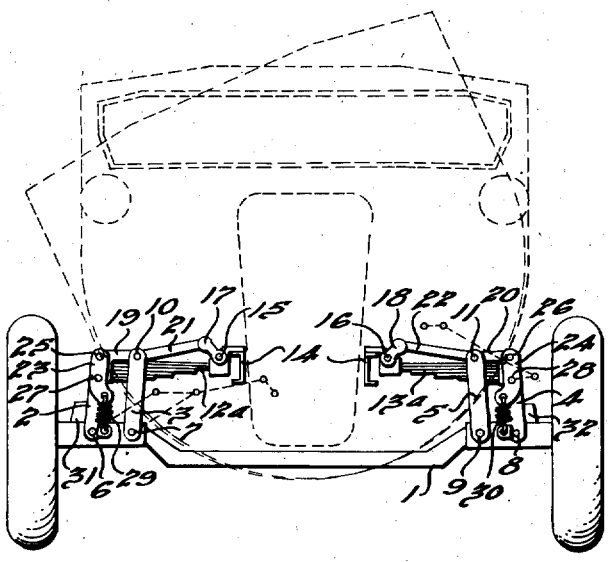
Fig. 2 is a front elevational view of a vehicle embodying the linkage illustrated in the line diagram of Fig. 1.
Figure 3:
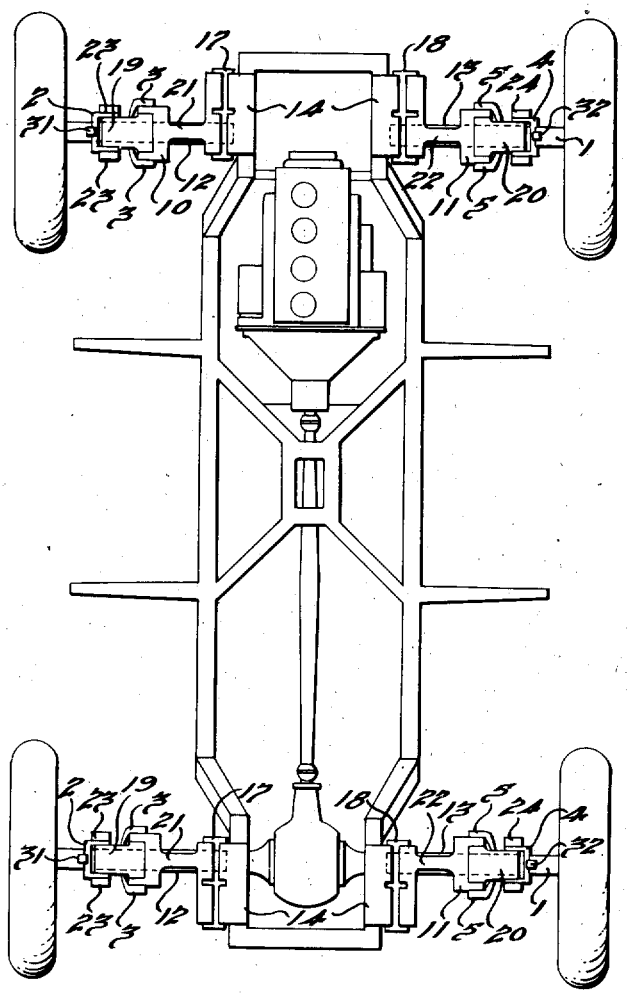
Fig. 3 is a plan view of a vehicle embodying the invention.

It is evident that a vehicle constructed in this manner will when negotiating curves behave as above described, that is, the body will assume an inclined or banked position by tilting toward the inner side of the curve as illustrated in an exaggerated position on Fig. 2. The body will automatically incline at a greater angle at higher speeds, dependent of course on the radius of the curve because the angle of inclination of the body is dependent on the centrifugal force developed which in turn is dependent on the radius of the curve and the speed at which the curve is negotiated. This construction presents the further advantage that when travelling over a surface inclined transversely to the direction of travel, as on a cambered road surface, the body will always be suspended in a generally horizontal position.

I claim:

1. A device for inclining the body of vehicles of all kinds especially motor vehicles, when negotiating curves, comprising in combination with the body and the wheel supporting means of the vehicle, two pairs of link systems, each link system comprising at least one bar, one of said pairs of link systems arranged at the rear end and the other at the front end of the vehicle with a link system of each pair adjacent an end of the wheel supporting means, the link systems of each pair pivotally connected a constant distance apart at their lower ends to the wheel supporting means and at their upper ends to said body at points closer together than the connecting points of the lower ends of said link systems, and springs adapted to normally maintain the car body in horizontal position, the axes of the pivotal connections between said links and said body and also between said links and said wheel supporting means lying in the longitudinal direction of the vehicle so that said link systems oscillate only in the transverse direction of the vehicle against the action of said springs on the body and resilient means interposed between the body and wheels to absorb vertical impulses to which the wheels are subjected.

2. A device as specified in claim 1, in which the wheel supporting means consists of axles and each link system includes two hingedly interconnected bars and means connected with each of said link systems and with the axles for guiding and restricting the movements of said link systems.

3. A device as specified in claim 1, in which the wheel supporting means consists of axles and each link system includes two hingedly interconnected bars, and pairs of hingedly interconnected rods, each pair of rods being hingedly connected at one end to one of said axles and at its other end to one of said link systems and adapted to guide and restrict the movement of said link systems.

4. A device as specified in claim 1, in which each link system includes a substantially vertical bar and a substantially horizontal bar, said horizontal bar consisting of blade springs.

5. A device as specified in claim 1, in which each link system includes a substantially vertical bar and a substantially horizontal bar, said horizontal bar consisting of blade springs, and means hingedly connected on the one hand with the body and on the other hand with the link system for preventing the edging of said springs.

6. In a motor vehicle having front and rear axle assemblies, connecting means between the front and rear axle assemblies, a body, connecting means comprising links interposed between the body and axle assemblies and hingedly connected longitudinally of the vehicle at their upper ends a constant distance apart to the body and hingedly connected longitudinally of the vehicle at their lower ends a constant distance apart to the axle assemblies, the connections to the body at the front and rear being spaced closer together than the connections to the axle assemblies whereby the body will assume an inclined or banked position under the influence of centrifugal forces developed as the vehicle rounds a curve, and resilient means associated with the axle assemblies to cushion vertical influences transmitted to the axle assemblies.

7. In a motor vehicle having front and rear axle assemblies, connecting means between the front and rear axle assemblies, a body, connecting means comprising links hingedly connected longitudinally of the vehicle at their upper ends a constant distance apart to the body and hingedly connected longitudinally of the vehicle at their lower ends a constant distance apart to the axle assemblies, the connections at the body being spaced closer together than at the axle assemblies whereby the body will assume an inclined or banked position accompanied by a lowering of the body relative to the axle assemblies when subjected to centrifugal forces developed as the vehicle rounds a curve, resilient means to progressively return the body to its normal position relative to the axle assemblies as the centrifugal force is reduced, and resilient means associated with the axle assemblies to absorb vertical shocks.

8. In a motor vehicle having front and rear axle assemblies, a body, connecting means comprising front and rear links interposed between the body and axle assemblies and hingedly connected longitudinally of the vehicle at their upper ends to the body and hingedly connected longitudinally of the vehicle at their lower ends to the axle assemblies, the connections to the body at the front and rear being spaced closer together than the connections at the front and rear to the axle assemblies and each remaining a constant distance apart whereby the body will assume an inclined or banked position when subjected to centrifugal forces developed as the vehicle rounds a curve, and resilient means interposed between the body and axle assemblies to absorb vertical shock transmitted to the axle assemblies.

9. In a motor vehicle having front and rear road engaging wheels, means to support the wheels, connecting means between the front and rear wheel supporting means, a body, connecting means comprising links pivotally connected at their upper ends to the body and at their lower ends to wheel supporting means to move only transversely of the vehicle, the transverse distance between the lower connections remaining substantially constant and being greater than the transverse distance between the upper connections which remains substantially constant whereby the body will assume an inclined position relative to the wheel supporting means accompanied by a raising of the side of the body on the outside of the curve when the vehicle is subjected to centrifugal forces, and resilient means between the body and wheels to absorb vertical impulses.

10. In a motor vehicle having front and rear road engaging wheels, means to support the wheels, connecting means between the front and rear wheel supporting means, a body, curve compensating connecting means comprising links pivotally connected at their upper ends to the body and at their lower ends to wheel supporting means to move only transversely of the vehicle, the transverse distance between the lower connections being greater than the transverse distance between the upper connections whereby the body will assume an inclined position relative to the wheel supporting means whereby the side of the body on the inside of the curve is lowered when the vehicle is subjected to centrifugal forces, resilient means urging the body towards the normal position relative to the wheel supporting means, and resilient means between the body and wheels to absorb vertical shocks.

11. In a motor vehicle having front and rear road engaging wheels, means to support the wheels, connecting means between the front and rear wheel supporting means, a body, connecting means comprising links pivotally connected at their upper ends to the body and at their lower ends to the wheel supporting means to move transversely of the vehicle, the transverse distance between the lower connections being greater than the transverse distance between the upper connections whereby the body will assume an inclined position relative to the wheel supporting means when the vehicle is subjected to centrifugal forces, resilient means urging the body towards the normal position relative to the wheel supporting means, and resilient means interposed between the body and wheels to absorb vertical shock to which the wheels are subjected.

12. A vehicle comprising front and rear road engaging wheels, wheel supporting means, a body, link means interposed between the wheel supporting means and body at the front and rear of the vehicle and having longitudinally extending hinge connections, the connections to the body being spaced closer together than the connections to the wheel supporting means whereby the center of gravity of the body will lie within an imaginary triangle formed by lines extended through the hinge connecting points on the wheel supporting means and body and whereby the body will assume an inclined position relative to the wheel supporting means when subjected to lateral forces developed as the vehicle rounds a curve, and resilient means interposed between the body and wheels to absorb certain vertical shocks.

13. A vehicle comprising front and rear road engaging wheels, wheel supporting means, a body, link means interposed between the wheel supporting means and body at the front and rear of the vehicle and having longitudinally extending hinge connections, the connections to the body being spaced closer together than the connections to the wheel supporting means and said connections remaining a constant distance apart whereby the body will assume an inclined position relative to the wheel supporting means when subjected to lateral forces developed as the vehicle rounds a curve, resilient means associated with the links to progressively urge the body toward its normal position relative to the wheel supporting means as the lateral force is reduced and resilient means between the body and wheels to absorb vertical shocks.

14. A vehicle comprising front and rear road engaging wheels, wheel interconnecting means associated with the wheels, a body, link means interposed between the wheel interconnecting means and body at the front and rear of the vehicle and having longitudinally extending hinge connections, the connections to the body being spaced closer together than the connections to the wheel interconnecting means whereby the body will assume an inclined position relative to the wheel interconnecting means when subjected to lateral forces developed as the vehicle rounds a curve, resilient means associated with the links to progressively urge the body toward its normal position relative to the wheel interconnecting means as the lateral force is reduced, and resilient means interposed between the body and wheels to absorb vertical shock to which the wheels are subjected.

15. In a vehicle having front and rear road engaging wheels, front and rear wheel supporting means, connecting means between the front and rear wheel supporting means, a body having a normal substantially upright position, paired angularly disposed links pivotally interconnecting the body with the front and rear wheel supporting means, the upper ends of the links being closer together than the lower ends and the axis of the pivotal connections between the links and the body and between the links and the front and rear wheel supporting means lying in the longitudinal direction of the vehicle and remaining a constant distance apart whereby the body may assume an inclined position relative to the wheel supporting means when subjected to lateral forces, and resilient means between the body and wheels to absorb vertical shock to which the wheels are subjected.

16. In a vehicle having front and rear road engaging wheels, front and rear wheel supporting means, connecting means between the front and rear wheel supporting means, a body having a normal substantially upright position, paired angularly disposed links pivotally interconnecting the body with the front and rear wheel supporting means, the upper ends of the links being closer together than the lower ends and the axis of the pivotal connections between the links and the body and between the links and the front and rear wheel supporting means remaining a substantially constant distance apart and lying in the longitudinal direction of the vehicle whereby the body may assume an inclined position relative to the wheel supporting means accompanied by a lowering of the center of gravity of the body relative to the wheel supporting means when subjected to lateral forces, resilient means urging the body toward the normal position, and resilient means between the body and wheels to absorb vertical shocks.

17. In a vehicle having front and rear road engaging wheels, front and rear wheels supporting means, connecting means between the front and rear wheel supporting means, a body having a normal substantially upright position, paired angularly disposed links pivotally interconnecting the body with the front and rear wheel supporting means, the upper ends of the links being closer together than the lower ends and the axis of the pivotal connections between the links and the body and between the links and the front and rear wheel supporting means lying in the longitudinal direction of the vehicle whereby the body may assume an inclined position relative to the wheel supporting means accompanied by a lowering of the center of gravity of the body relative to the wheel supporting means when subjected to lateral forces, resilient means urging the body toward the normal position, and resilient means interposed between the body and the wheel supporting means to absorb impulses and shocks to which the wheels are subjected.

18. In a motor vehicle having front and rear road engaging wheels, means to support the wheels, a body, connecting means comprising links pivotally connected at their upper ends to the body and at their lower ends to wheel supporting means to move transversely only of the vehicle, the transverse distance between the lower connections remaining constant and being greater than the transverse distance between the upper connections whereby the body will assume an inclined position relative to the wheel supporting means when the vehicle is subjected to centrifugal forces, and resilient means between the body and wheels to absorb vertical shocks.

19. A motor vehicle comprising front and rear wheel supporting mechanisms, a body, angularly disposed means pivotally connected between the body and wheel supporting mechanism, the axes of the pivotal connections between said means and the body and between said means and the wheel supporting mechanism remaining a constant distance apart and lying in the longitudinal direction of the vehicle whereby the body may assume an inclined position relative to the wheel supporting mechanism as the vehicle is subjected to lateral forces, and resilient means associated with the wheel supporting mechanism to absorb vertical shocks to which the wheels are subjected.

20. A motor vehicle comprising front and rear wheel supporting mechanism, a body, angularly disposed means pivotally connected between the body and wheel supporting mechanism, the upper ends of said means being closer together than the lower ends and the axes of the pivotal connections between said means and the body and between said means and the wheel supporting mechanism remaining a substantially fixed distance apart and lying only in the longitudinal direction of the vehicle whereby the body may assume an inclined position relative to the wheel supporting mechanism as the vehicle is subjected to lateral forces, and resilient means associated with the wheel supporting mechanism to absorb vertical impulses to which the wheels are subjected.

21. In a vehicle having wheel supporting means, a superstructure, connecting means between the wheel supporting means and superstructure comprising links having pivoted connections extending longitudinally of the vehicle and connected to the superstructure a substantially constant transverse distance apart and connected to the wheel supporting means a substantially constant transverse distance apart, the transverse distance between the connections of the links to the superstructure being less than the transverse distance between the connections of the links to the wheel supporting means whereby the superstructure may assume an inclined or banked position transversely only relative to the wheel supporting means under the influence of lateral forces developed as the vehicle rounds a curve, and resilient means associated with the wheel supporting means to absorb vertical shocks.

22. A vehicle having front and rear wheel supporting means, a superstructure, connecting means comprising motion transmitting means having pivoted connections extending longitudinally of the vehicle and interposed between the front and rear wheel supporting means and superstructure, the motion transmitting means being connected a substantially constant transverse distance apart to the superstructure and being connected a substantially constant transverse distance apart to the wheel supporting means, the transverse distance between the connections of the motion transmitting means to the superstructure being less than the transverse distance between the connections of the motion transmitting means to the wheel supporting means whereby the superstructure may shift transversely only relative to the wheel supporting means under the influence of lateral forces to vary its angular relation relative to the wheel supporting means to partially compensate the effect of centrifugal force exerted on the superstructure as the vehicle rounds a curve, and resilient means associated with the wheel supporting means to absorb vertical shocks.

JOACHIM KOLBE.